United States Patent [19]

Humbert et al.

[11] 3,835,567

[45] Sept. 17, 1974

[54] TROLL FISHING APPARATUS

[76] Inventors: Wilbur E. Humbert; Fred W. Humbert, both of 1914 N. Bay Dr., North Bend, Oreg.

[22] Filed: Sept. 10, 1973

[21] Appl. No.: 395,423

[52] U.S. Cl. ............................................. 43/6.5
[51] Int. Cl. ............................................. A01k 79/00
[58] Field of Search ............................ 43/6.5, 27.4

[56] References Cited
UNITED STATES PATENTS
3,049,829  8/1962  Clapp .................................... 43/6.5
3,355,835  12/1967  Lyons .................................... 43/6.5

Primary Examiner—Louis G. Mancene
Assistant Examiner—Daniel J. Leach

[57] ABSTRACT

Fishing apparatus for use with a trolled fishing lure having on one end a fish lure and on the other end a stop, comprising a trolled line support and receiving means positioned on the support for releasably retaining the stop in the trolling position of the line. A reel is mounted for rotation in a predetermined station relative to the support. Stop receiving means is present on the reel for releasably retaining the stop in the retrieving position of the line. When a fish strikes, the trolled line is transferred from the support to the reel, and reeled in.

11 Claims, 6 Drawing Figures

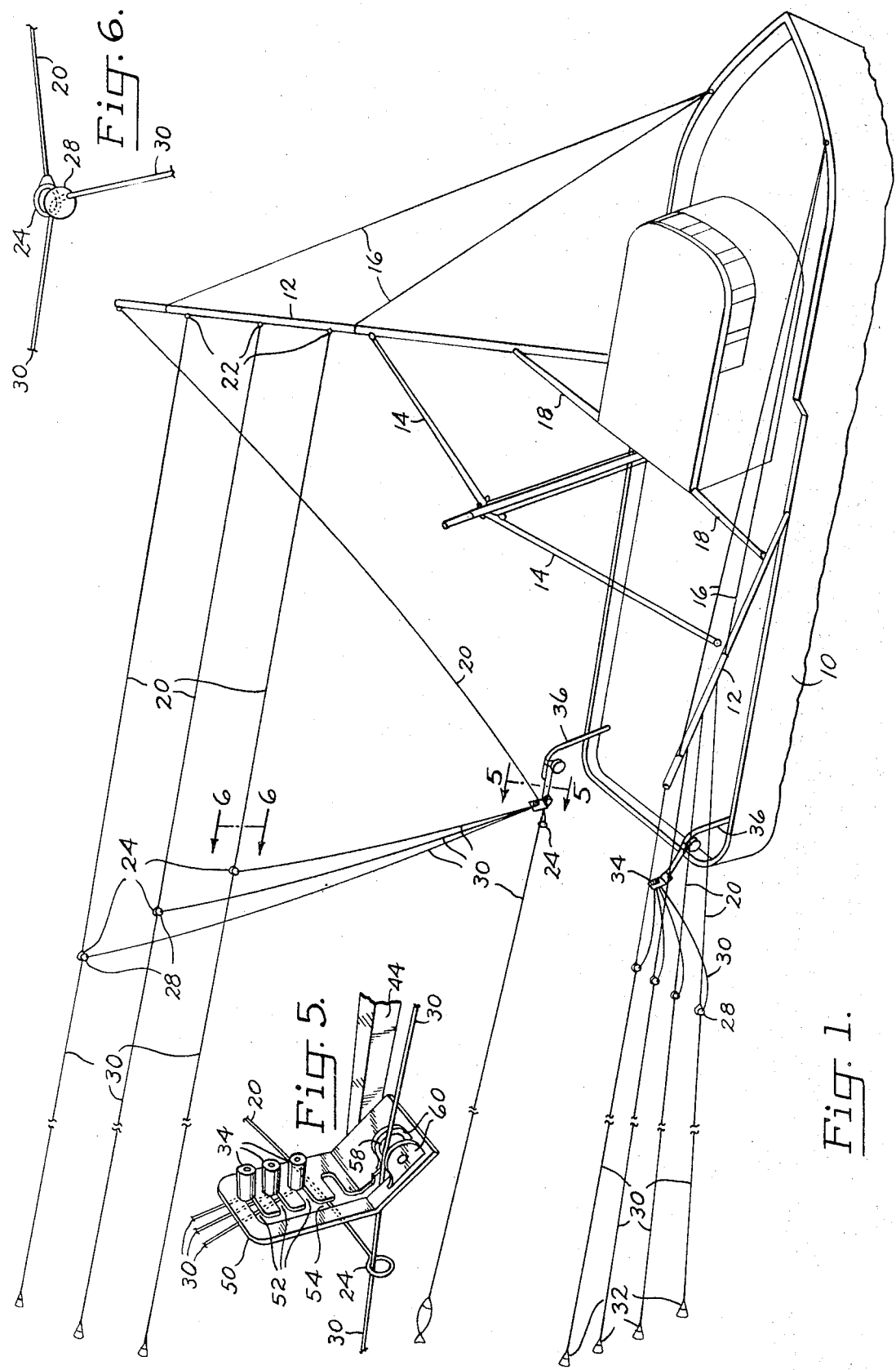

TROLL FISHING APPARATUS

BACKGROUND OF THE INVENTION

This invention relates to fishing apparatus. It pertains particularly to apparatus for catching tuna and other fish by trolling lures from a boat. Most particularly, the invention relates to tuna jig fishing apparatus.

In one technique for catching albacore tuna and other large fish, a plurality of feather jigs or other lures are trolled one from each of a plurality of lines trolled behind a boat moving at a rapid rate of speed. The lines are spaced on opposite sides of the boat from outrigger type jig poles. The lines are let out and hauled in either by hand or by means of powered reels or gurdies. This procedure is susceptible to several difficulties.

The lines tend to tangle when turning the boat and in particular when landing two or more fish simultaneously. The procedure is too slow, particularly in view of the fact that when a school of tuna is encountered it is to the advantage of the fisherman to catch as many as possible while the school is biting, or before it is lost.

A considerable physical effort is required to maniuplate the lines and land the fish. What is sport to the sport fishermen is a chore to the commercial fishermen.

The mechanism by which the various lines are manipulated is relatively complicated and subject to failure at critical times. The nylon lines employed to troll the jigs are subject to breakage, particularly under jerk loads.

Large fish are difficult to handle under the circumstances under which they are caught and the problem is further complicated by an accumulation of loose line which may be dropped on the deck as it is hauled in.

It accordingly is the general object of the present invention to provide apparatus for catching fish by trolling which apparatus is particularly well adapted for fast trolling a multiplicity of trolled lines when fishing for large fish such as albacore tuna.

A further object of the present invention is the provision of fishing apparatus for catching fish by trolling which apparatus is of relatively simple construction, easy to use, relatively free from maintenance problems, and requires only one power driven reel for several lines.

Still a further object of the present invention is the provision of fishing apparatus employing trolled lines which may be used without tangling or breaking the lines and which requires a minimum amount of attention and effort on the part of the fisherman.

BRIEF STATEMENT OF THE INVENTION

In accordance with the present invention, the foregoing problems are overcome and the objects of the invention achieved by the provision of fishing apparatus designed for use with a trolled fishing line having on one end a fish lure and on the other a stop. The apparatus comprises a trolled line support provided with one or a plurality of stop receiving means positioned for releasably retaining one or a plurality of fishing line stops in the trolling position of the line.

A reel is mounted for rotation in a predetermined station relative to the support. A line guide sheave preferably is interposed between the support and the reel.

The reel mounts stop receiving means for releasably retaining the stop when the line is transferred from the support to the reel, as occurs when it is desired to retrieve a hooked fish. A clutch associated with the reel enables starting and stopping the rotation of the reel as required to play and land the fish.

BRIEF DESCRIPTION OF THE DRAWINGS

FIG. 1 is a top perspective view of a commercial fishing boat equipped with the herein described fishing apparatus.

FIGS. 5 and 6 are detail perspective views looking in the direction of the arrows 5—5 and 6—6 of FIG. 1, respectively, and illustrating the manner of supporting and manipulating the trolled lines.

DETAILED DESCRIPTION OF A PREFERRED EMBODIMENT

Figure 3:
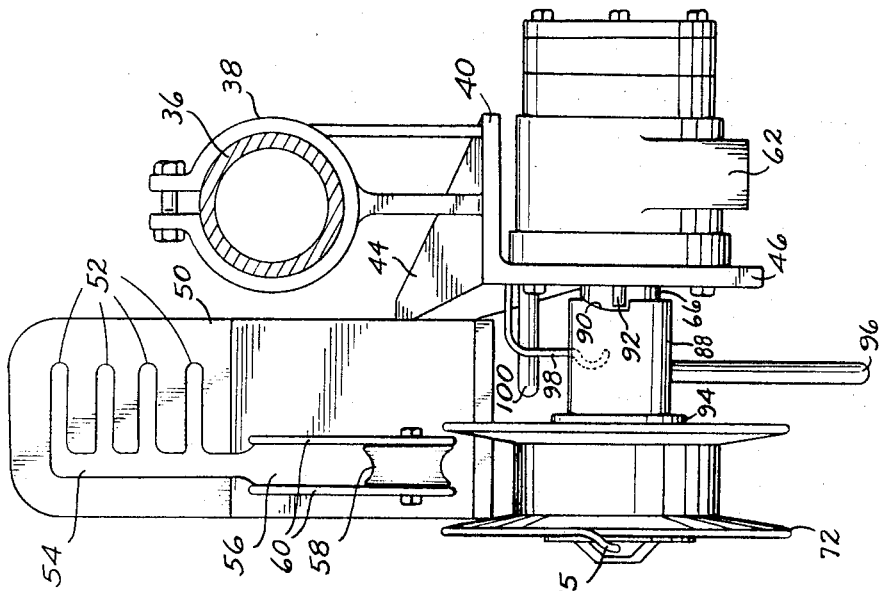
FIG. 3 is a view in end elevation of the apparatus.

FIG. 1 illustrates schematically a commercial fishing boat using the hereindescribed fishing apparatus.

The boat 10 is provided with a pair of conventional outriggers 12 pivotally mounted to the sides of the boat and raised and lowered by means of cable assemblies 14. The outriggers are stabilized by stays 16 and spreaders 18.

Each outrigger supports along its length a plurality of longitudinally spaced positioning lines 20 having for their function connecting the fishing lines to the outriggers and maintaining them in proper laterally spaced relation. Each line 20 is provided at its forward end with attaching means 22 for attaching it to the outrigger. At its trailing end it is provided with guide means such as a guide ring 24 for receiving and guiding the fishing line.

The fishing lines 30 comprise nylon, wire, or corded fishing lines of predetermined lengths. At their trailing ends they mount the fishing lures, for example feather jigs 32. At their lead ends they are provided with integrated stop fingers 34. These are knotted or fused or brazed into the line as the case may be.

Intermediate their ends the lines mount stops 28. These are dimensioned not to pass guide rings 24 against which they bear when the lines are trolled.

Support means is provided for supporting a plurality of lines trolled behind the boat at proper distances from the boat and in properly spaced relation to each other. The support means employed for this purpose is illustrated particularly in FIGS. 2 and 3.

The support means is attached to a suitable structural member such as a stanchion 36 to which it is releasably clamped by means of a clamp 38. It is mounted on a heavy structural base 40 which is connected to clamp 38 by means of a web 42.

An arm 44, which may comprise an angle iron having a depending segment 46, extends outwardly and rearwardly from base 40. At its outer end it mounts an angled support plate, or manifold assembly 50.

This key member of the assembly includes a plurality of aligned, parallel, longitudinally spaced slots 52. These are dimensioned to pass fish lines 30 but to retain stops 34 fixed to the ends of the lines.

Slots 52 communicate with a common channel or passageway 54 which extends lengthwise of the support plate and terminates in an opening 56.

A guide sheave or pulley 58 is rotatably mounted on parallel, outwardly extending tabs 60, positioned one on each side of opening 56.

Figure 2:
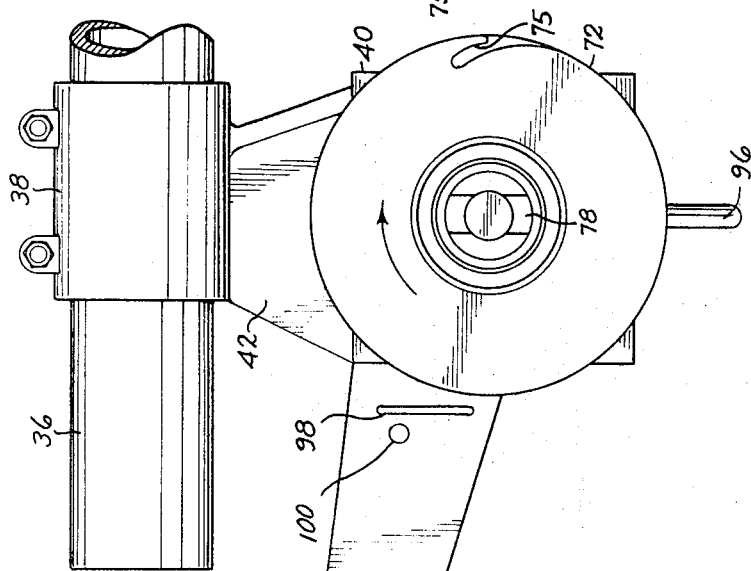
FIG. 2 is a view in side elevation of the apparatus.
Figure 4:
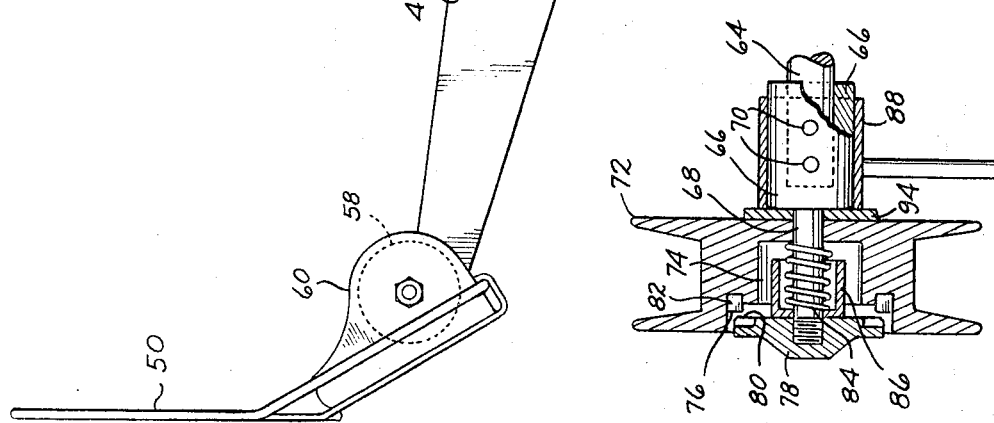
FIG. 4 is a sectional view of a reel or gurdy employed in the apparatus.

Power driven reel means is provided for reeling up the fishing lines transferred from slots 52 to the reel. The construction of this component is illustrated in FIGS. 2, 3, and 4.

The power source for the reel comprises an hydraulic or electric rotary motor 62. This is mounted on vertical plate 46 and has a shaft 64 extending through an opening in the plate.

Shaft 64 is connected to the hollow base 66 of reel spindle 68 by means of set screws 70.

The reel spindle slidably mounts a reel 72 of customary shape and having a capacity sufficient to hold the desired amount of line. It is provided with a central recess 74 opening out onto the face of the reel and provided with a stepped shoulder 76.

Reel 72 also has a slot 75 in its outer face plate, FIG. 2. This slot serves the important function of providing stop retaining means on the reel for retaining stop 34 of a fishing line being wound up on the reel. Accordingly it is dimensioned to pass the fishing line but retain the stop.

Clutch means is provided for shifting the reel between driving and idling conditions.

To this end a clutch plate 78 is threaded onto the end of the reel spindle. It is provided with clutching elements 80 on its inner face. Cooperating clutching elements 82 are present on the shoulder formed by step 76 of the reel recess.

Biasing means bias the reel, which is slidably mounted on spindle 68, into a normal position of clutch disengagement. The biasing means comprise a coil spring 84 mounted on spindle 68 and housed in a spring cage 86.

The clutch is operated by means of a thrust sleeve 88 which is mounted for rotation on the enlarged base 66 of spindle 68.

On its inner face the thrust sleeve has an operating cam 90, FIG. 3, positioned in working relation to a cam follower 92 fixed to and extending outwardly from the surface of structural plate 46. A thrust washer 94 is interposed between the outer end of the thrust sleeve and the inner face of reel 72.

An operating lever 96 is fixed to and extends radially from thrust sleeve 88 in a position convenient to the operator.

A spring clip 98, and a cooperating stop peg 100 are mounted on and extend outwardly from plate 46. They serve the functions of receiving handle 96 and retaining it in the disengaged position of the clutch.

OPERATION

The manner of operating the hereindescribed fishing apparatus is as follows:

Fishing lines 30 are threaded through the appropriate ones of guide rings 24 on outrigger pole support lines 20. The stop 34 on the end of each line is inserted in the selected one of the slots 52 of manifold support plate 50.

The lines are trolled at conventional trolling speeds. When a fish strikes the lure on one of the lines, the fisherman grasps the stop on that line and transfers the line via channel 54 across guide sheave 58 to reel 72. Before or during this operation he engages the clutch of gurdy reel 72 by means of operating lever 96.

With the reel running at a suitable rotational speed, he slips the line into slot 75 in the outer face plate of the reel, and engages the stop against the plate.

The reel then does the work of pulling the fish to the boat. When the fish reaches a position approximately 3 feet from the back of the boat, the fisherman operates lever 96 to stop the reel and pulls the fish into the boat by hand.

After the fish has been taken off the hook, the lure is tossed over the stern of the boat and the reel put in free wheeling by rotating the operating handle 96 to a clutch disengaged position. Spring 86 then disengages clutch plate 78 so that the reel turns freely and pays out the line.

After all of the line is out, the fisherman grasps stop 34, removes it from slot 75 in the reel plate, and transfers it via channel 54 to the appropriate one of retaining slots 52 in manifold support plate 50. The line then is in trolling position, ready for another strike.

In this manner a considerable number of fishing lines may be trolled at the same time, without tangling the lines, and with a minimum of effort and lost time in catching and landing the fish and returning the lures to trolling position.

Having thus described our invention in preferred embodiments, we claim:

1. Fishing apparatus for use with a trolled fishing line having on one end a fish lure and on the other a stop, the apparatus comprising in combination:
   a. a trolled line support,
   b. on the support, stop receiving means positioned for releasably retaining the stop in the trolling position of the line,
   c. reel means mounted for rotation at a predetermined station relative to the support and
   d. stop receiving means on the reel means positioned for releasably retaining the stop in the retrieving position of the line.

2. The fishing apparatus of claim 1 wherein the stop receiving means on the support comprises a slotted plate having slots dimensioned to pass the line but retain the stop.

3. The fishing apparatus of claim 1 wherein the stop receiving means on the reel means comprises slot means dimensioned to pass the line but retain the stop.

4. The fishing apparatus of claim 1 wherein the support means comprises a plate having a plurality of spaced, aligned slots communicating with a common passageway and each adapted to releasably retain a line.

5. The fishing apparatus of claim 1 wherein the support means comprises a plate having a plurality of spaced, aligned slots communicating with a common passageway and each adapted to releasably retain a line, and including a sheave means interposed between the plate and the reel means for guiding a line removed from one of the slots and connected to the reel means.

6. The fishing apparatus of claim 1 wherein the reel means comprises gurdy means and clutch means connecting the gurdy means to a power source.

7. The fishing apparatus of claim 1 wherein the reel means comprises gurdy means and clutch means connecting the gurdy means to a rotary power source, the clutch means comprising:
  a. a rotatable power transmission shaft,
  b. coupling means on one end of the shaft for coupling it to the rotary power source,
  c. a reel slidably mounted for free rotation on the other end of the shaft,
  d. the reel having a central recess opening out onto the outer face of the reel,
  e. a clutch plate fixed to the outer end of the shaft and overlying the recess,
  f. cooperating clutching elements mounted on the opposed surfaces of the clutch plate and reel face,
  g. spring means in the housing positioned for biasing the clutch plate outwardly into a position of disengagement with the reel, and
  h. thrust sleeve means mounted on the shaft inside the reel and bearing against the inner face of the same for thrusting the reel longitudinally of the shaft into clutching engagement with the clutch member.

8. The fishing apparatus of claim 7 wherein the thrust sleeve means comprises a sleeve slidably mounted on the shaft, with its outer end bearing against the side face of the reel, cam means on the sleeve for driving it in the thrusting direction upon rotation of the sleeve, and lever means extending outwardly from and fixed to the sleeve for imparting rotary motion thereto.

9. In fishing apparatus for use with a trolled fishing line having on one end a fish lure and on the other a stop, fishing line support means comprising:
  a. a plate,
  b. a plurality of parallel spaced aligned slots in the plate,
  c. all of the slots communicating with a common passageway in the plate,
  d. each slot being adapted to receive one of a plurality of fishing line-stop combinations,
  e. each slot being dimensioned to pass the fishing line but retain the stop.

10. In fishing apparatus for use with a trolled fishing line having on one end a fish lure and on the other end a stop and including a trolled line support having stop receiving means thereon and reel means mounted for rotation at a predetermined station relative to the support, clutch means connecting the reel means to a source of rotary power and comprising:
  a. a rotatable power transmission shaft,
  b. coupling means on one end of the shaft for coupling it to the rotary power source,
  c. a reel slidably mounted for free rotation on the other end of the shaft,
  d. the reel having a central recess opening out onto the outer face of the reel,
  e. a clutch plate fixed to the outer end of the shaft and overlying the recess,
  f. a pair of clutching elements mounted on the opposed surfaces of the clutch plate and reel face,
  g. spring means in the housing positioned for biasing the clutch plate outwardly into a position of disengagement with the reel, and
  h. thrust sleeve means mounted on the shaft inside the reel and bearing against the inner face of the same for thrusting the reel longitudinally of the shaft into engagement with the clutch plate.

11. The clutch means of claim 10 wherein the thrust sleeve means comprises a sleeve slidably mounted on the shaft, with its outer end bearing against the side face of the reel, cam means on the sleeve for driving it in the thrusting direction upon rotation of the sleeve, and lever means extending outwardly from and fixed to the sleeve for imparting rotary motion thereto.

* * * * *